United States Patent [19]

Miyake

[11] Patent Number: 4,682,313
[45] Date of Patent: Jul. 21, 1987

[54] DISK STORING SYSTEM FOR DISK PLAYER

[75] Inventor: Kazunari Miyake, Higashihiroshima, Japan

[73] Assignee: Sharp Kabushiki Kaisha, Japan

[21] Appl. No.: 740,718

[22] Filed: Jun. 3, 1985

[30] Foreign Application Priority Data

Sep. 18, 1984 [JP] Japan .................................. 59-197619
Sep. 18, 1984 [JP] Japan .................................. 59-197620

[51] Int. Cl.$^4$ ............................................. G11B 23/04
[52] U.S. Cl. ..................................... 369/39; 369/194; 369/291
[58] Field of Search ................... 369/291, 36, 39, 194

[56] References Cited

U.S. PATENT DOCUMENTS

| | | | |
|---|---|---|---|
| 2,521,046 | 9/1950 | Darwin | 369/39 |
| 2,565,881 | 8/1951 | Peters | 369/36 |
| 4,481,618 | 11/1984 | Nakayama | 369/194 |
| 4,589,104 | 5/1986 | Brockley | 369/291 |
| 4,614,474 | 9/1986 | Sudo | 369/194 |

Primary Examiner—Steven L. Stephan
Attorney, Agent, or Firm—Birch, Stewart, Kolasch & Birch

[57] ABSTRACT

A disk storing system for an auto-changer type disk player in which a disk such as a record or a compact disk (CD) is automatically taken out from one of shelves and placed on a turn table for reproduction of data stored in the disk. The disk is stored as protected by a disk holder on the shelf, and the disk holder is easily taken out from or returned to the shelf by means of a disk extracting mechanism.

4 Claims, 12 Drawing Figures

DISK STORING SYSTEM FOR DISK PLAYER

BACKGROUND OF THE INVENTION

The present invention relates to a disk storing system for a so-called auto-changer type disk player in which a disk such as a record or a compact disk (CD) is automatically taken out of a shelf and placed on a turn table for reproduction.

It is well known that, in the conventional auto-changer disk player, many disks are stored in a rack, being set naked on their edges, and a desired disk is taken out by the clamping arms from among these many disks and placed on the turn table according to the playing instruction.

With the auto-changer disk player of this type, it is difficult for an operator to put a disk in or take it out from the rack because of the construction of the rack. Moreover, it is possible to damage the disk when taking it out from or returning it to the rack. Furthermore, the disk may be damaged by the clamping arms when the disk is being transferred between the turn table and the rack.

SUMMARY OF THE INVENTION

Accordingly, it is the object of the present invention to overcome the above mentioned disadvantages of the conventional disk storing system by providing a disk storing system for conveniently storing disk holders, whereby a disk which is protected by a disk holder is selectively played by an operator.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing object is accomplished in one embodiment of the present invention by providing a disk storing system for a disk player in which a desired disk holder is removed from one of the shelves which accomodate a disk holder and is transferred to a reproducing unit by a disk extracting mechanism. The shelves are vertically arranged at appropriate intervals, each of the shelves being composed of a board having open sides to the disk extracting mechanism and to the reproducing unit.

The above object is also accomplished in another embodiment of the present invention by providing a disk storing system for a disk player in which a desired disk holder is taken out from one of shelves and is transferred to a reproducing unit by a disk extracting mechanism, said disk holder having a holder recess for housing a disk and an opening in the bottom of the holder recess through which opening is inserted the turn table of the reproducing unit. The holder recess has the peripheral wall formed to have a slanted surface to support the outer periphery of the disk in such a manner that the disk does not come in contact with the bottom of the holder recess. The holder recess is provided with a rib around the opening in the bottom so as to support the disk at the radial inner, no-recorded portion. Lock means and spring means are provided between said disk holder and said shelf so that the disk holder is forced by said spring means to be locked with the shelf, whereby the disk holder is slidably released from the shelf by the disk extracting mechanism in the lock releasing direction against the force of the spring means.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
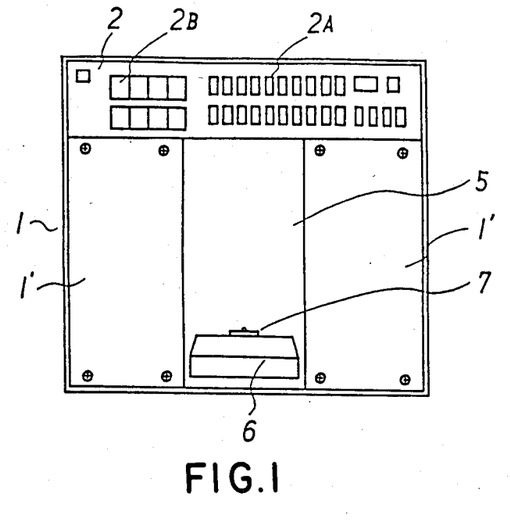
FIGS. 1 and 2 are a front view and a top view in section respectively, which schematically show a disk player with its front panel partially removed and which contain a disk storing system embodying the present invention.
Figure 2:
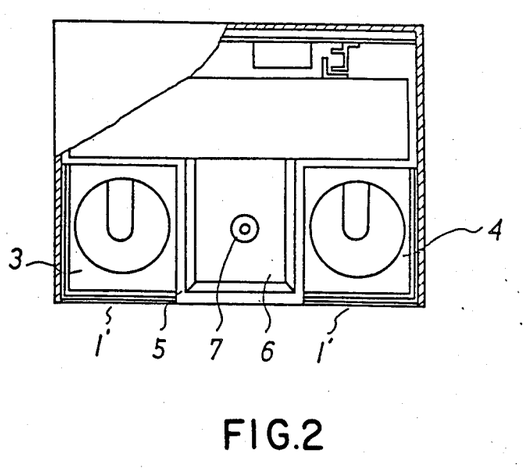

Now, one of the embodiments of the present invention will be described in detail with reference to the attached drawings. In FIGS. 1 and 2 which are a front view and a top view in section of the disk player with its front panel partially removed and which contain the disk storing system of the present invention, reference number 1 denotes a main body cabinet having an operation panel 2 on the upper front, said operation panel 2 including various keys such as disk select keys, a play key and a stop key. The main body cabinet 1 houses laterally arranged disk storing systems 3, 4. A vertically extending passage 5 is provided between the two disk storing systems 3, 4. A reproducing unit 6 which contains a turn table 7, a motor (not shown) to rotate the turn table 7 and a pick-up-head (not shown) is installed in said passage 5 and vertically moved by a lifting mechanism which is not shown.

Since the two disk storing system 3 and 4 have the identical construction, the invention will be described hereinbelow with reference to the disk storing system 3 alone.

Figure 3:
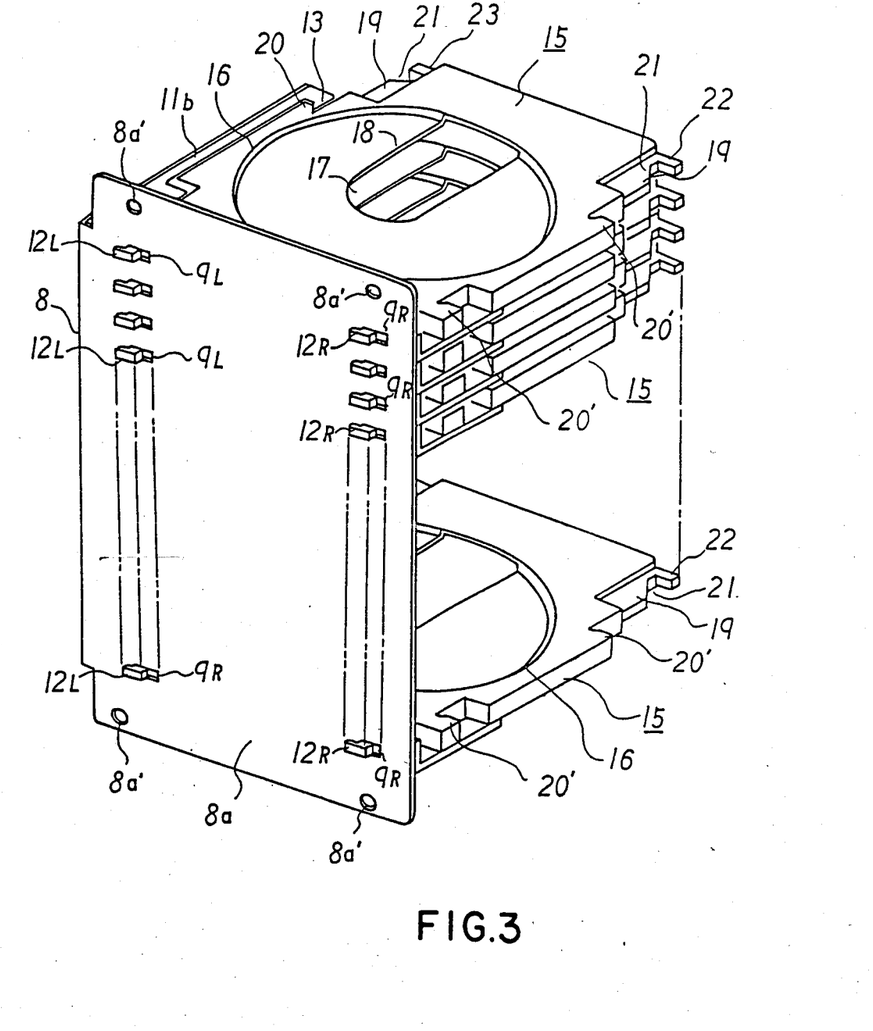
FIG. 3 is a perspective view of the disk storing system in FIGS. 1 and 2.

In FIG. 3 which is a perspective view of the disk storing system, element 8 denotes a storage frame installed behind a panel 1' in FIG. 1. As shown, the storage frame 8 has a L shape configuration when viewed from the top and contains a front panel 8a. A number of engagement holes 9L . . . , 9R . . . are vertically provided in the lateral end portions of the front panel 8a which is provided with screw holes 8a' in the four corners thereof and connected to the panel 1' by screws.

Figure 6:
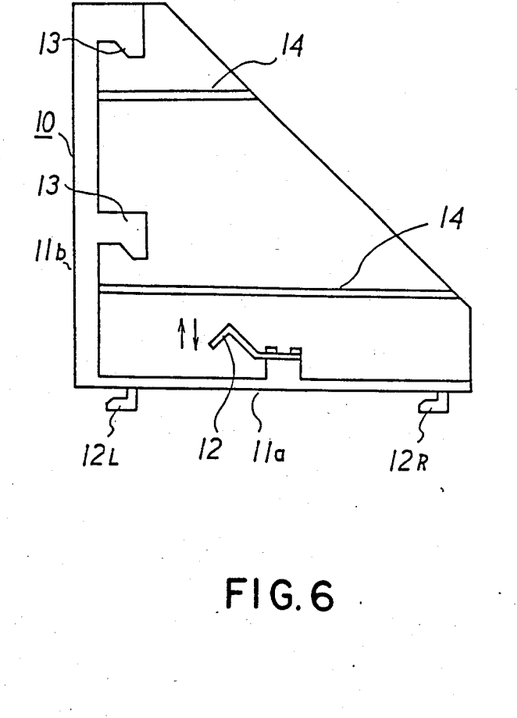
FIGS. 6 and 7 are a plan view and a side view respectively showing the construction of a shelf of the disk storing system.
Figure 7:
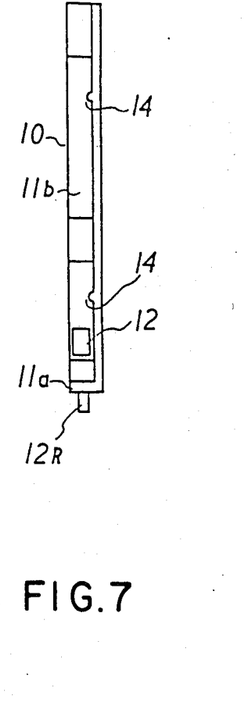

Element Ten denotes a shelf comprising a triangular base board obtained by cutting off one of the four corners of an approximate square board, and side walls 11a and 11b raised from the front edge and from one of the side edges respectively of the base board, said side walls 11a and 11b communicating with each other. Thus, the rear edge and the other of the side edges of the base board are open. The side wall 11a is provided with a leaf spring 12 at the center on the linner side and with engagement members 12L, 12R at the lateral end portions on the outer side for insertion into the engagement holes 9L, 9R in the storage frame 8. Further, locking members 13, 13 are longitudinally provided on the inner side of the side wall 11b.

Elements 14, 14 are guide ribs provided parallel with each other on the base board of the shelf 10 along the side wall 11a.

According to the present invention, the shelf 10 with the above construction is prepared in a large number. Each of these shelves 10 is connected to the storage frame 8 by engagement between the engagement members 12L, 12R of the shelf and the engagement holes 9L, 9R in the storage frame 8, the side wall 11b being fixed to the storage frame 8 by screws. Thus, the plurality of shelves 10 together with the storage frame 8 comprise a multi-step rack, as shown in FIG. 3.

Element 15 denotes a disk holder. As shown in FIGS. 8 through 11, the disk holder 15 comprises a thick board material having a disk-accomodating holder recess 16 in the center on the upper side, a first round opening 17 formed in the center of the bottom 16a of said holder recess 16 for the turn table 7 to be inserted therethrough from under side, a second opening 18 for allowing the pick-up-head (not shown) to move and which communicates with said first opening 17 and elongates to the rear end of the holder recess 16, locking projections 20, 20 . . . on both longitudinal edges for engagement with the corresponding locking members 13 provided on the shelf 10, and clamped parts 19, 19 also on both longitudinal edges to be clamped by extracting arms (later described).

Figures 8, 10:
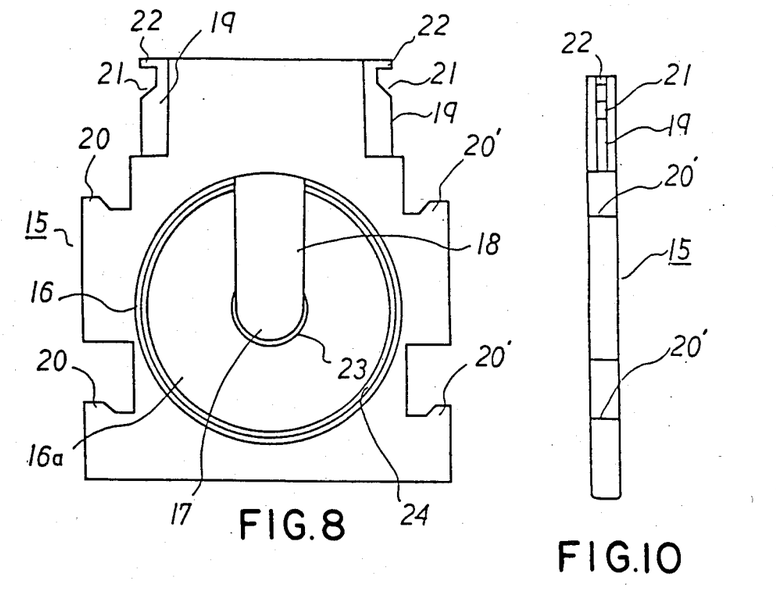
FIGS. 8 through 11 are a plan view, a rear view, a side view and a front view in section respectively, showing the construction of a disk holder of the disk storing system.
Figure 9:
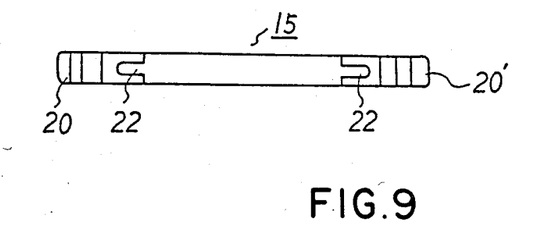

The clamped parts 19, 19 are formed thinner than the disk holder 15 as shown. Each of the clamped parts 19, 19 contains an obliquely cut side face 21 so that the clamped part becomes narrower from the front toward the rear. An engagement projection 22 is also provided on each of the clamped parts 19, 19 at the area behind the obliquely cut side face 21.

Figure 11:
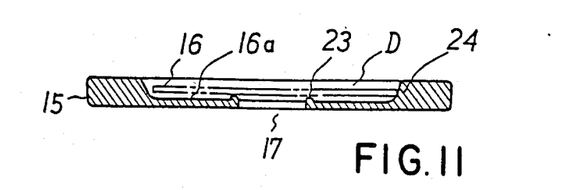
Figure 12:
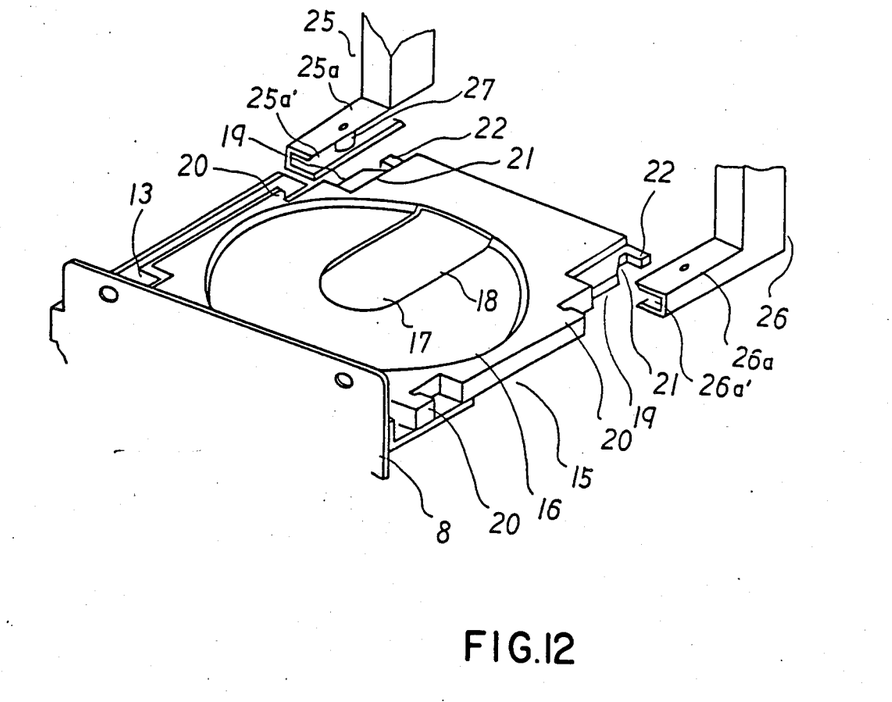
FIG. 12 is a perspective view showing the essential part of the disk storing system of the present invention which corresponds to the disk storing system in FIG. 4.

A rib 23 is provided on the bottom 16a of the holder recess 16 around the first opening 18 so as to support the disk D at the radial inner, no-recorded portion when the disk D is placed in the holder recess 16. Further, the peripheral wall around the holder recess 16 defines a slant support surface 24 to support the outer peripheral edge of the disk D so that the disk D does not come in touch with the holder recess bottom 16a.

Figure 4:
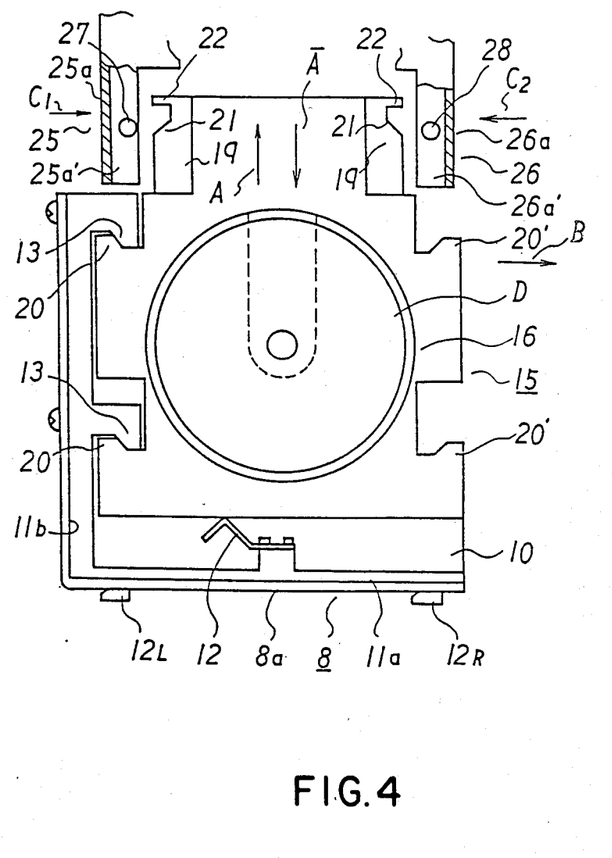
FIGS. 4 and 5 are plan viewsshowing different conditions under which the disk holder is being taken out of the disk storing system.

The thus formed disk holder 15 is mounted on the shelf 10 so as to be movable both longitudinally and laterally, with the locking projections 20 engaged with the locking members 13, as shown in FIG. 4.

Elements 25 and 26 denote the extracting arms of the disk extracting mechanism (not shown) provided in the back of the disk storing system 3. The extracting arms 25, 26 have horizontal protrusions 25a, 26a, on the sides of which are formed grooves 25a', 26a' to fit on the clamped parts 19, 19. Clamping rollers 27, 28 are installed in the grooves 25a', 26a' of the protrusions 25a, 26a, respectively.

The extracting arms 25, 26 extending from the disk extracting mechanism are movable in the directions closing to each other or in the directions away from each other. They also move vertically or laterally by means of the disk extracting mechanism which moves in the back of the disk storing system 3.

The disk storing system of the present invention described above are operated as follows:

Now, suppose the disk holder 15 which contains the disk D is loaded on each of the shelves 11 of the disk storing systems 3, 4. When the user depresses one of the disk select keys 2A together with the play key 2B on the operation panel 2, the control circuit (not shown) actuates the lifting mechanism to shift the reproducing unit 6 to the level corresponding to the shelf 10 where the selected disk is stored.

Almost at the same time, the disk extracting mechanism for the disk storing system where the selected disk is stored moves vertically, controlled by the control circuit so that the extracting arms 25, 26 are positioned on the level corresponding to the shelf 10 where the selected disk is loaded.

The disk storing system of this state is shown in FIG. 4. It this state, the disk holder 15 is being pushed toward the rear (in the direction indicated by the arrow A) so that the locking projections 20 are engaged with the locking members 13 thereby preventing the disk holder 15 from moving laterally toward the passage 5 (that is, in the direction indicated by the arrow B). At this time, the extracting arm 25, 26 are positioned so that the grooves 25a', 26a' face the clamped parts 19, 19 respectively and the clamping rollers 27, 28 face the obliquely cut side faces 21, 21 of the clamped parts 19, 19 respectively.

Then, the extracting arms 25, 26 are moved by the function of the operating means of the disk extracting mechanism in the directions closing to each other (as indicated by the arrows C1 and C2) to start clamping the disk holder 15.

As the extracting arms 25, 26 move closer to each other, the grooves 25a', 26a' fit on the clamped parts 19, 19 and the clamping rollers 27, 28 come in contact with the obliquely cut side faces 21, 21 respectively.

Figure 5:
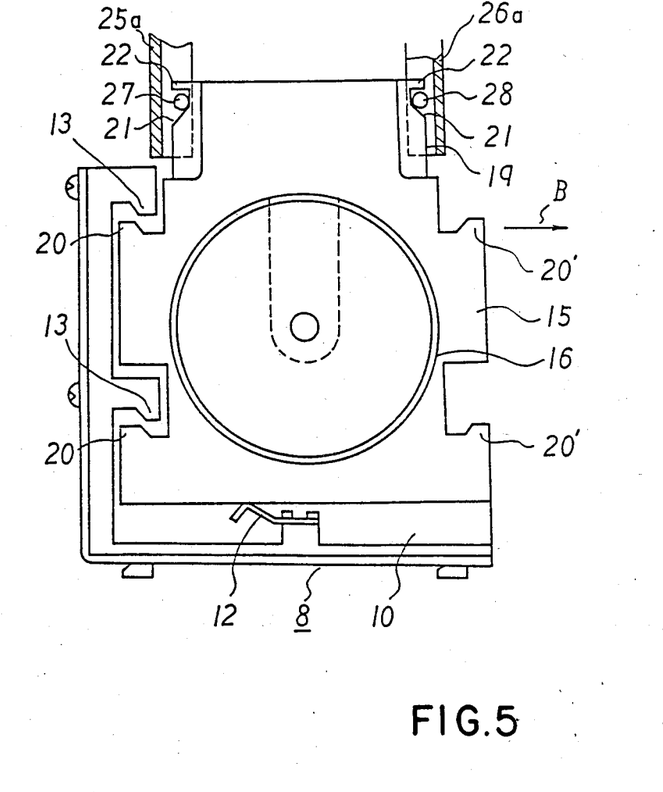

The extracting arms 25, 26 continue moving closer to each other even after the clamping rollers 27, 28 come in contact with the obliquely cut side faces 21, 21. As a result, the clamping rollers 27, 28 push the disk holder 15 through the obliquely cut side faces 21, 21 toward the front (in the direction indicated by the arrow $\overline{A}$) against the force of the leaf spring 12, whereby the locking projections 20 are released from the locking members 13. Eventually, the clamping rollers 27, 28 are engaged with the engagement projections 22 so that the extracting arms 25, 26 clamp the disk holder 15 at the clamped parts 19, 19. (See FIG. 5)

When the disk holder 15 is clamped between the extracting arms 25, 26, the disk extracting mechanism and therefore the extracting arms 25, 26 are moved toward the passage 5 as controlled through the control circuit.

As the disk extracting mechanism is moving, the disk holder 15 which is now released from the locking members 13 slides along the guide ribs 14, 14 on the shelf 10 in the direction of the arrow B until it is positioned right over the reproducing unit 6 that has been lifted to the level of the selected disk holder. Then, the extracting arms 25, 26 are swiveled down by the function of the operating means controlled through the control circuit so that the disk holder 15 is placed on the reproducing unit 6.

As the disk holder is being placed on the reproducing unit 6, the turn table of the reproducing unit 6 is inserted through the first opening 17 in the disk holder 15 to support the center of the disk D mounted in the disk holder 15 on its top surface.

Upon completion of loading the disk holder 15 on the reproducing unit 6, the operating means controlled through the control circuit effect the extracting arms 25, 26 to move in the directions apart from each other so that the disk holder 15 is released from the extracting arms 25, 26. Then, the protrusions 25a, 26a of the extracting arms 25, 26 are lifted up to the stand-by positions also by the function of the operating means.

Thus, the extraction of the disk holder 15 is completed. The turn table 7 of the reproducing unit 6 is then rotated and the pick up is actuated to start playing the disk D.

When the reproduction from the disk D is over, the control circuit controls the operating means to move the extracting arms 25, 26 downwardly and then in the directions closing to each other so that the disk holder 15 is clamped again.

Then, the disk holder 15 clamped between the extracting arms 25, 26 is raised from the turn table 7 by the function of the operating means (that is, the disk holder 15 is rmoved from the reproducing unit 6). Thereafter, the disk extracting mechanism and therefore the extracting arms 25, 26 which clamp the disk holder 15 move in the direction of the disk storing system 3 so that the disk holder 15 is shifted in the opposite direction of the arrow B.

Thus, the disk holder 15 slides along the guide ribs 14, 14 from the open side of the shelf 10 and onto the shelf 10.

When the disk holder 15 comes in contact with the side wall 11b of the shelf 10, the control circuit functions to stop the return movement of the extracting arms. (See FIG. 5.)

The control circuit then functions to move the extracting arms 25, 26 in the directions apart from each other so that the disk holder 15 is released from the extracting arms 25, 26.

When released from the extracting arms 25, 26, the disk holder 15 is pushed toward the rear (in the direction of A) by the force of the leaf spring 12. As a result, the locking projections 22 engage with the locking members 13, holding the disk holder 15 in the stand-by state.

In the above operation, a disk holder is extracted from the disk storing system 3. A disk holder is extracted from the other disk storing system 4 by the same operation as above because the disk storing system 4 has the same construction as the disk storing system 3, excepting that the disk holder 15 is locked on the shelf of the disk storing system 4 be the engagement between the locking projections 20', 20' and the locking members of the shelf.

According to this invention, as described above, the disk is properly mounted in the disk holder and the disk holder is accurately placed on the shelf.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A disk storage system for a disk player comprising a cabinet containing a reproducing unit,
a plurality of shelves vertically arranged within said cabinet,
disk holders, each containing a recess for holding a disk therein, and an opening in the bottom thereof for the reproducing unit to be inserted therein, said disk holders being disposed in said plurality of shelves,
a disk extracting mechanism operatively associated with said disk holders for transferring said disk holders containing said disk to said reproducing unit; said recess in said disk holder having peripheral walls which are inclined to support the periphery of the disk, and said disk holder being provided with a rib disposed around the opening in the bottom thereof for supporting the disk at the radial, center, non-recording portion of the disk, whereby the recording portion of the disk does not come into contact with the bottom of the disk holder.

2. The disk storage system of claim 1, wherein lock means and spring means are provided between said shelf and said disk holder, said spring means holding said disk holder in said shelf in a locked position, whereby the disk holder can be released from the shelf by the disk extracting mechanism operating against the bias of the spring means.

3. The disk storage system of claim 1, wherein each shelf is provided with guide ribs which guide the disk holder to the reproducing unit.

4. The disk storage system of claim 3, wherein the reproducing unit is a turn table which moves vertically within the cabinet to positions adjacent the shelves.

* * * * *